United States Patent Office 3,341,318
Patented Sept. 12, 1967

3,341,318
AGRICULTURAL MULCH AND HERBICIDAL
COMPOSITION AND METHOD
John E. Chilton, Tempe, Ariz., assignor to Arizona Agrochemical Corporation, a corporation of Arizona
No Drawing. Filed Dec. 24, 1964, Ser. No. 421,084
3 Claims. (Cl. 71—96)

This invention relates to novel agricultural mulch compositions, to improved methods for applying NPA herbicides and to novel compositions useful in such methods. In a particular aspect, the invention concerns methods for suppressing and controlling weed growth in the presence of crops.

Although much effort and research has been directed to the use of lignin sulfonate wastes (a by-product of the paper industry) as agricultural mulches, the latest reliable technical reports indicate that there is very little, if any, economic incentive for such use of these materials as the beneficial effects are marginal, speculative or non-existent.

I have now discovered that lignin sulofnate compositions can be effectively employed as a major component of agricultural mulches which also include carbon black and water, which functions as a suspending agent and carrier for applying the mulch compositions to the soil. These mulch compositions provide increased soil temperatures, thus assuring better germination of crop seeds and earlier emergence and earlier maturity, provide for more uniform and sturdier stands, conserve soil moisture, reduce windblown soil loss, mix readily and uniformly, spray easily without clogging applicator nozzles and are non-corrosive to application equipment. Of special importance, the compositions are non-toxic and biodegradable to non-toxic residues.

The novel mulch compositions hereabove described are preferably applied to the soil in the form of an aqueous suspension or solution of the mulch components. Suitably such aqueous compositions can comprise from about 10 to about 15 pounds of wood-derived solids and from about 1 to about 3 pounds of carbon black per 100 pounds of water. NPA-containing compositions can suitably comprise from about 0.15 to about 0.20 pound of the active herbicidal compound per 100 pounds of water.

The lignin sulfonate-carbon black mulch compositions hereabove described have proved especially useful in connection with cucurbit and vine crops, such as cucumbers, melons, squash, soybeans, etc. In these crops the stands are noticeably more lush, uniform and green when the seed beds are given pre-emergence treatment with these mulch compositions. Evidently there is some sort of coaction between the components of the compositions as these results are not obtainable when the components are applied separately.

The lignin sulfonate compositions employed in the practice of my invention are well-known materials derived from the waste liquor of the sulfite paper process. The best present evidence indicates that lignin sulfonic acids are repeating unit polymers having an average molecular weight of upwards of about 5,000–10,000. The repeating unit has the general structure of guaiacyl propane, viz.,

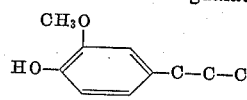

The sulfonic acid group is known to be attached to an aliphatic carbon atom, probably adjacent to the benzene ring. Also, it is generally considered that one or more hydroxyl groups may appear on the three carbon side chain.

The lignin sulfonates are typically available commercially as the alkaline (ammonium or alkali metal, especially sodium) salt of the lignin sulfonic acids. The commercially available lignin sulfonate compositions typically contain, in addition to the lignin sulfonates, various other non-cellulosic wood components such as wood sugars, typically reducing sugars such as mannose, glucose, xylose, galactose, arabinose, fructose, etc., and, in addition, trace elements may be present such as magnesium, aluminum, zinc, potassium, cobalt and boron. Detailed chemical analyses of lignin sulfonate compositions which are suitably employed in the practice of my invention are found in Mulvaney et al., J. Am. Chem. Soc. 73, 1255–1257 (1951).

In another aspect of the invention I have developed improved methods for applying NPA herbicides, novel compositions useful in such methods and methods for suppressing and controlling weed growth in the presence of crops, especially cucurbit or vine crops.

The so-called "NPA" herbicides have significant commercial potential because of their favorable combination of toxicological and selective herbicidal properties. However, the use of NPA herbicides, particularly in connection with the suppression and control of weeds in the presence of cucurbit and vine crops, has been seriously hindered by the tendency of such herbicides to injure the crop plants, commonly by stunting, stand reduction or chlorosis.

As used herein, the term "NPA herbicide" is used in the art-accepted sense to denote and include N-1 naphthyl phthalamic acid, salts of said acid, including the alkali metal salts thereof, especially N-1 naphthyl sodium phthalamate, and the amide form, N-1 naphthyl phthalimide.

The NPA herbicides are employed primarily for the control of pigweed, purslane, lamb's quarter, ragweed, chickweed, foxtail, crabgrass, velvetleaf, cockleburr and bindweed, as well as certain annual grasses and other broadleaf weeds. For further information concerning the use of NPA herbicides, including USDA registrations, see "USDA Summary of Registered Agricultural Pesticide Chemical Uses," pages 468, 468(a), 469 (all issued Oct. 15, 1962) and pages 470–471 (issued Mar. 17, 1961).

I have now discovered that injury to crop plants, especially to cucurbits or vine crops such as cantaloupe, cucumber, muskmelon, pumpkins, squash, watermelon, and soybeans arising from the use of NPA herbicides can be substantially reduced or prevented entirely by applying the NPA herbicide to the soil in the locus of the crop plants or seeds from which said plants are grown as a minor component of a mulch comprising the lignin sulfonate-carbon black-water compositions hereabove described. Of course, as will be apparent to those skilled in the art, the carbon black can optionally be omitted from the NPA-containing mulches if the mulch is employed primarily for the herbicidal effect of the NPA and the other benefits of the lignin sulfonate-carbon black composition are not necessary or desired. Typically and preferably, the growth of weeds in the presence of crop plants, especially vine crops, is suppressed by applying a band of the NPA-containing mulch composition, e.g., 6 inch–12 inch wide, on top of the seed bed immediately after the crop seeds are planted, typically and suitably at a rate of about 40 gallons per acre.

The NPA herbicides are employed in the compositions of the invention in a minor effective amount, i.e., an amount sufficient to provide substantial herbicidal action when the mulch compositions are applied to the soil as above-described. Typically, and in accordance with the preferred practice of the invention, I employ from about 5.0 to about 7.5 pounds of the active NPA herbicide per 100 pounds of the mulch composition (water-free basis).

A surprising and valuable feature of my invention is the provision of methods and compositions for applying NPA herbicides which substantially reduce or prevent injury to crop plants, especially vine crops, which would otherwise result from the use of such quantities of herbicides by the known methods of application such as direct spraying or dusting.

The following examples are presented for the better understanding of the invention and as an illustration of the presently preferred embodiments thereof.

tions employed and the results observed one month after treatment are tabulated in Table A below.

TABLE A

| Row No. | Pre-emergence Treatment | Results 1 mo. after treatment |
|---|---|---|
| 1 | Control—No Treatment | Poor crop emergence. Seed germinating area dry. Moderate weed emergence. |
| 2–9 | 12″ band of NPA¹ at 2⅔ pints/acre in 30 gal. "Mulch B."² | Good crop emergence. Some nutgrass but no broadleaf weeds. |
| 10 | 12″ band of NPA¹ at 5⅓ pints/acre in 30 gal. "Mulch B." | Good emergence. No grasses, good control of broadleaf weeds. |
| 11–19 | Same as Rows 2–9 | Same as Rows 2–9. |
| 20 | Control—No Treatment | Very spotty crop and weed emergence. |
| 21–24 | 8″ band of "Mulch B" at 60 gal./acre | Excellent emergence and vigorous growing plants. Considerable lambsquarter, some mustards. |
| 25 | Control—No Treatment | Very weak crop stand. |
| 26 | Same as Rows 21–24 | Same as Rows 21–24. |
| 27–32 | 8″ band of NPA¹ at 2⅔ pints/acre in 30 gal. water. | Very poor stand. Emerged plants stunted and marked chlorosis. Good control of broadleafs, some water grass. |
| 33 | 8″ band—same as Rows 27–32 plus petroleum based mulch³ at 60 gal./acre. | Same as Rows 27–32. |
| 34–end | 8″ band Petroleum based mulch³ at 60 gal./acre. | Good crop emergence. Moderate weed development. |

¹ N-1 naphthyl sodium phthalamate ("Alanap-3").
² See Example 1.
³ Commercially available as "Encap."

EXAMPLE 1

Mulch A

A mulch composition is prepared by mixing (1) 500 pounds of ammonium lignin sulfonate composition (commercially designated Orzan AL–50, a 50 wt. percent solution of wood-derived solids in water), (2) 0.875 pound of NPA herbicide (N-1 naphthyl sodium phthalamate form, commercially designated "Alanap-3," a liquid formulation containing two pounds per gallon of active NPA herbicide), (3) 17.5 pounds of carbon black and (4) 400 pounds of water.

Mulch B

A mulch composition is prepared by mixing 500 gal. water, 500 gal. of lignin sulfonate composition (commercially designated "Orzan AL–50," a 50 wt. percent solution of wood derived solids in water) and 160 pounds of carbon black.

EXAMPLE 2

The "Mulch A" composition of Example 1 is applied at the rate of 360 pounds per acre as a 12 inch strip over the seed beds of 400 acres of cantaloupes located in the Yuma Valley, near Somerton, Ariz. The crop matured approximately two weeks earlier than a similar crop planted and raised without the aid of the aforesaid mulch composition. Effective weed control was achieved by means of the NPA herbicide but none of the stunting or stand reduction usually caused by NPA herbicides occured in the mulched crop.

EXAMPLE 3

To check the relative effectiveness of various methods of applying NPA herbicides and the relative effectiveness of the mulches of the invention in comparison with mulch compositions of the prior art, an 18 acre plot of cantaloupes was given various pre-emergence treatments as follows:

Beginning on one side of the field, the seed bed rows were treated with various compositions. The composi-

EXAMPLE 4

Results similar to those of the test of Example 2 are obtained when NPA herbicides in the form of N-1 naphthyl phthalamic acid or N-1 naphthyl phthalimide are employed in place of the N-1 naphthyl sodium phthalamate of Example 2.

EXAMPLE 5

Compositions having similar characteristics to the compositions of Example 1 may be prepared by employing the sodium lignin sulfonate mulch compositions commercially available as Orzan S in place of the Orzan AL–50 of Example 1. Of course, additional water is employed in formulating the compositions since the Orzan S is initially in the dry-form.

Having described my invention and the preferred embodiments thereof, I claim:

1. An agricultural mulch composition comprising:
   (a) lignin sulfonate in an amount sufficient, when applied to the soil in the locus of seeds and growing crop plants, to form an effective moisture conserving soil mulch;
   (b) carbon black in an amount sufficient, when applied to the soil in the locus of seeds and growing crop plants, to provide effectively increased soil temperatures; and
   (c) water in an amount sufficient to form an effective carrier for said lignin sulfonate and carbon black for application to the soil.

2. The method of reducing injury to crop plants from an NPA herbicide selected from the class consisting of N-1 naphthyl phthalamic acid, N-1 naphthyl sodium phthalamate, and N-1 naphthyl phthalimide, comprising applying said NPA herbicide to the soil as a minor component of a composition comprising:
   (a) said NPA herbicide in an amount sufficient, when applied to the soil, to suppress weed growth in the presence of said crop plants; and
   (b) lignin sulfonate in an amount sufficient to substantially reduce herbicidal injury to said crop plants from said NPA herbicide.

3. An agricultural mulch composition comprising:
   (a) lignin sulfonate in an amount sufficient, when applied to the soil in the locus of seeds and growing crop plants, to form an effective moisture conserving soil mulch;
   (b) carbon black in an amount sufficient, when applied to the soil in the locus of seeds and growing crop plants, to provide effective increased soil temperatures;
(c) water in an amount sufficient to form an effective carrier for said lignin sulfonate and carbon black for application to the soil, and
(d) a herbicide selected from the class consisting of N-1 naphthyl phthalamic acid, N-1 naphthyl sodium phthalamate, and N-1 naphthyl phthalimide, said herbicide being present in an amount sufficient, when applied to the soil, to suppress weed growth in the presence of crop plants.

References Cited

UNITED STATES PATENTS

| | | | |
|---|---|---|---|
| 1,871,050 | 8/1932 | Eveland | 47—9 |
| 2,770,537 | 11/1956 | Smith et al. | 71—2.6 X |
| 2,877,599 | 3/1959 | Hebestreet et al. | 47—9 |
| 2,961,799 | 11/1960 | Coe | 47—9 |
| 3,017,720 | 1/1962 | Busch | 47—9 |
| 3,207,594 | 9/1965 | Wagner | 71—2.6 |
| 3,269,824 | 8/1966 | Aswell | 47—9 |

OTHER REFERENCES

Spulnik et al., Soil Science, vol. 49, January 1940, pages 37 to 47.

Everson et al., Soil Science, vol. 69, #5, May 1950, pages 369 to 376.

LEWIS GOTTS, *Primary Examiner.*

JAMES O. THOMAS, JR., *Examiner.*